United States Patent  
Kishimoto et al.

(10) Patent No.: US 10,120,155 B2  
(45) Date of Patent: Nov. 6, 2018

(54) OPTICAL FIBER-CABLE BRANCH MEMBER AND OPTICAL FIBER-CABLE BRANCH STRUCTURE

(71) Applicant: FUJIKURA LTD., Tokyo (JP)

(72) Inventors: Sho Kishimoto, Sakura (JP); Norihiro Momotsu, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/609,963

(22) Filed: May 31, 2017

(65) Prior Publication Data

US 2017/0343759 A1 Nov. 30, 2017

(30) Foreign Application Priority Data

May 31, 2016 (JP) .................................. 2016-108741

(51) Int. Cl.  
*G02B 6/44* (2006.01)

(52) U.S. Cl.  
CPC ......... *G02B 6/4471* (2013.01); *G02B 6/4432* (2013.01); *G02B 6/4452* (2013.01); *G02B 6/4472* (2013.01); *G02B 6/4486* (2013.01)

(58) Field of Classification Search  
CPC ... G02B 6/4471; G02B 6/4432; G02B 6/4452  
USPC ....................................................... 385/102  
See application file for complete search history.

(56) References Cited

U.S. PATENT DOCUMENTS

| | | | | |
|---|---|---|---|---|
| 5,119,457 A | * | 6/1992 | Callahan ............. | G02B 6/3817 174/79 |
| 2005/0053343 A1 | * | 3/2005 | Lee ...................... | G02B 6/4411 385/114 |
| 2013/0156388 A1 | * | 6/2013 | Hsing .................. | G02B 6/4444 385/99 |

(Continued)

FOREIGN PATENT DOCUMENTS

| | | |
|---|---|---|
| EP | 3032304 A1 | 6/2016 |
| JP | 2002-090553 A | 3/2002 |
| JP | 2006-221129 A | 8/2006 |

(Continued)

OTHER PUBLICATIONS

Office Action issued in corresponding Japanese Application No. 2016-108741 dated Jan. 30, 2018 (4 pages).

(Continued)

*Primary Examiner* — Jerry Blevins  
(74) *Attorney, Agent, or Firm* — Yuichi Watanabe

(57) ABSTRACT

An optical fiber cable branch member includes a branch member main body, a cable-fixing portion which holds and fixes, onto the branch member main body, an end portion of a jacket of an optical fiber cable including a first optical fiber core bundle and the jacket which coats an outer circumference of the first optical fiber core bundle, and includes a tension resistance member buried in a cable longitudinal direction, a tube-fixing portion which fixes, onto the branch member main body, a plurality of protective tubes which respectively cover and protect respective outer circumferences of a plurality of second optical fiber core bundles (Continued)

obtained by branching the first optical fiber core bundle extending from the end portion of the jacket, and a main body-fixing portion which fixes the branch member main body onto an object to be attached.

13 Claims, 12 Drawing Sheets

(56) References Cited

U.S. PATENT DOCUMENTS

2015/0295394 A1    10/2015  Byczkiewicz
2017/0299831 A1*   10/2017  Ott ..................... G02B 6/4429

FOREIGN PATENT DOCUMENTS

JP      2007-114658 A      5/2007
JP      2009294470 A  *   12/2009   ............... G02B 6/44

OTHER PUBLICATIONS

Office Action issued in corresponding Japanese Application No. 2016-108741 dated May 8, 2018 (6 pages).
Notice of Allowance issued in corresponding Japanese Application No. 2016-108741 dated Sep. 4, 2018 (3 pages).

* cited by examiner

OPTICAL FIBER-CABLE BRANCH MEMBER AND OPTICAL FIBER-CABLE BRANCH STRUCTURE

BACKGROUND OF THE INVENTION

Field of the Invention

The present disclosure relates to an optical fiber cable branch member and an optical fiber cable branch structure.

Priority is claimed on Japanese Patent Application No. 2016-108741 filed on May 31, 2016, the content of which is incorporated herein by reference.

Description of the Related Art

For example, a plurality of optical fibers extending from an optical fiber cable is spliced to other optical fibers or the like in a closure or a fused portion accommodation tray. In such an optical fiber cable, a number of optical fibers are accommodated in a jacket.

Thus, for splicing a number of optical fibers to other optical fibers or the like, in some cases, the optical fiber cable is laid in the vicinity of the closure or the fused portion accommodation tray, and at the vicinity, the optical fibers extending from the optical fiber cable are branched.

As an optical fiber cable branch member which branches a plurality of optical fibers, a member has been conventionally proposed including a branch housing that branches a plurality of optical fibers extending from an optical fiber cable, the plurality of optical fibers being inserted into a hollow tube (e.g., refer to US 2015/0295394 A1). The branch housing fixes the optical fiber cable at an intake port.

The optical fiber cable fixed in the branch housing disclosed in the patent document 1 is provided with a tension resistance member so as not to apply tension to the optical fibers. Because the tension resistance member is disposed along the inner circumferential surface of a jacket, when the optical fiber cable is fixed, the tension resisting member is also fixed.

Nevertheless, among optical fiber cables, for example, a wrapping tube cable (WTC) has a tension resistance member fixedly disposed in a jacket in a cable longitudinal direction. In the wrapping tube cable, even if the cable is fixed, the tension resistance member cannot be fixed. Thus, even if the wrapping tube cable is fixed, the tension resistance member sometimes becomes unstable.

In addition, the above-described optical fiber cable branch member is attached to an object to be attached such as a closure. As there are various attachment modes of the optical fiber cable branch member, the attachment of the optical fiber cable branch member can be problematic in some cases.

The present invention has been devised in view of the aforementioned circumstances, and provides an optical fiber cable branch member and an optical fiber cable branch structure that can be easily fixed to an object to be attached such as a closure.

SUMMARY OF THE INVENTION

According to a first aspect of the present invention, an optical fiber cable branch member includes a branch member main body, a cable-fixing portion which holds and fixes, onto the branch member main body, an end portion of a jacket of an optical fiber cable including a first optical fiber core bundle and the jacket which coats an outer circumference of the first optical fiber core bundle, and includes a tension resistance member buried in a cable longitudinal direction, a tube-fixing portion which fixes, onto the branch member main body, a plurality of protective tubes which respectively cover and protect respective outer circumferences of a plurality of second optical fiber core bundles obtained by branching the first optical fiber core bundle extending from the end portion of the jacket, and a main body-fixing portion which fixes the branch member main body onto an object to be attached.

According to the above-described aspect, the branch portion main body is provided with the cable-fixing portion, and the cable-fixing portion holds and fixes the jacket which coats the outer circumference of the first optical fiber core bundle, and includes the tension resistance member buried in the cable longitudinal direction. Thus, the tension resistance member can be fixed together with the jacket. In addition, the optical fiber cable branch member includes the main body-fixing portion which fixes the branch member main body onto the object to be attached. Thus, the optical fiber cable branch member can be easily fixed to the object to be attached such as a closure.

According to a second aspect of the present invention, an optical fiber cable branch structure includes an optical fiber cable including a first optical fiber core bundle and a jacket which coats an outer circumference of the first optical fiber core bundle, and includes a tension resistance member buried in a cable longitudinal direction, an optical fiber cable branch member which branches the first optical fiber core bundle extending from an end portion of the jacket, into a plurality of second optical fiber core bundles, the plurality of second optical fiber core bundles branched by the optical fiber cable branch member, and a plurality of protective tubes which respectively cover and protect respective outer circumferences of the plurality of second optical fiber core bundles, the optical fiber cable branch member including a branch member main body, a cable-fixing portion which holds and fixes the end portion of the jacket of the optical fiber cable onto the branch member main body, a tube-fixing portion which fixes, onto the branch member main body, the plurality of protective tubes which protect the plurality of second optical fiber core bundles obtained by branching the first optical fiber core bundle, and a main body-fixing portion which fixes the branch member main body onto an object to be attached.

According to the above-described aspect, the optical fiber cable branch structure can be easily attached to the object to be attached such a closure.

According to a third aspect of the present invention, in the optical fiber cable branch structure according to the above-described second aspect, the object to be attached may be a conductive member, and be connected to a grounding cable, the tension resistance member of the optical fiber cable may be formed by a conductive member, the tension resistance member may extend from the end portion of the jacket of the optical fiber cable fixed on the optical fiber cable branch member, and the tension resistance member may be electrically-connected with the object to be attached.

According to the above-described aspect, a member for grounding the tension resistance member becomes unnecessary, and this contributes to a reduction in the number of components.

According to a fourth aspect of the present invention, in the optical fiber cable branch structure according to the above-described third aspect, the extending tension resistance member may be electrically-connected with the object to be attached by being sandwiched between the branch member main body of the optical fiber cable branch member and the object to be attached.

According to the above-described aspect, the tension resistance member can be easily grounded by the tension resistance member being sandwiched between the branch member main body and the object to be attached.

According to a fifth aspect of the present invention, in the optical fiber cable branch member according to the above-described first aspect, the branch member main body may include a first member fixed to a conductive member connected to a grounding cable, a second member to be joined to the first member, and a joint portion which joins the first member and the second member, and the tension resistance member may be held by the first member and the second member joined by the joint portion.

According to the above-described aspect, the tension resistance member can be easily grounded by being held by the first member and the second member.

According to a sixth aspect of the present invention, in the optical fiber cable branch member according to the above-described first or fifth aspect, the cable-fixing portion and the tube-fixing portion may be provided on a plate material.

According to the above-described aspect, the cable-fixing portion and the tube-fixing portion can be integrated, and a downsizing as a whole can be achieved.

According to a seventh aspect of the present invention, in the optical fiber cable branch member according to any one aspect of the above-described first, fifth, and sixth aspects, the cable-fixing portion may further include a band attachment portion to which a fastening band which can fasten the optical fiber cable is attached.

According to the above-described aspect, the optical fiber cable can be easily fixed.

According to an eighth aspect of the present invention, in the optical fiber cable branch structure according to the above-described second or third aspect, the branch member main body may include a first member fixed to a conductive member connected to a grounding cable, a second member to be joined to the first member, and a joint portion which joins the first member and the second member, and the joint portion may be disposed at a position where placement positions of the second optical fiber core bundles obtained by branching optical fiber cores extending from the optical fiber cable, and protected by the protective tubes are avoided.

According to the above-described aspect, even after the second optical fiber core bundles are protected by the protective tubes, the protective tubes don't affect the joining of the branch member main body and the object to be attached.

According to a ninth aspect of the present invention, in the optical fiber cable branch structure according to any one aspect of the above-described second, third, and eighth aspects, an exposed placement region in which an exposed optical fiber core is disposed may be provided between the cable-fixing portion and the tube-fixing portion.

According to the above-described aspect, a cover or the like that protects an optical fiber core provided between the cable-fixing portion and the tube-fixing portion is not required. This simplifies the structure. This is especially preferable when the optical fiber cable branch member is accommodated in a housing or the like of a closure, because the optical fiber core provided between the cable-fixing portion and the tube-fixing portion is rarely exposed to a severe environment.

According to a tenth aspect of the present invention, in the optical fiber cable branch structure according to any one aspect of the above-described second, third, eighth, and ninth aspects, the tube-fixing portion may include a dividing portion which divides the plurality of protective tubes.

According to the above-described aspect, the plurality of protective tubes can be easily divided.

According to an eleventh aspect of the present invention, in the optical fiber cable branch structure according to any one aspect of the above-described second, third, and eighth to tenth aspects, the tube-fixing portion may include a banding band which bands the plurality of protective tubes, and a plurality of attachment holes into which the banding band is insertable.

According to the above-described aspect, the banding band can be easily attached to the tube-fixing portion regardless of the number of protective tubes to be banded by the banding band.

According to a twelfth aspect of the present invention, in the optical fiber cable branch structure according to any one aspect of the above-described second, third, and ninth to eleventh aspects, a protection portion which protects an optical fiber core may be provided between the cable-fixing portion and the tube-fixing portion.

According to the above-described aspect, even when the optical fiber cable branch member is provided on the outside of a housing or the like of a closure, damages to an optical fiber core provided between the cable-fixing portion and the tube-fixing portion can be prevented.

According to a thirteenth aspect of the present invention, in the optical fiber cable branch structure according to any one aspect of the above-described second, third, and ninth to twelfth aspects, a hold portion which holds the tension resistance member may be included, and the hold portion may be attached to a metal member provided in a closure.

According to the above-described aspect, the optical fiber cable branch member can be easily attached to the closure.

The optical fiber cable branch member and the optical fiber cable branch structure according to the above-described aspects of the present invention can be easily fixed to an object to be attached such as a closure.

DETAILED DESCRIPTION OF THE PREFERRED EMBODIMENTS

Next, an embodiment according to several embodiments of the present invention will be described based on the drawings.

Figure 1:
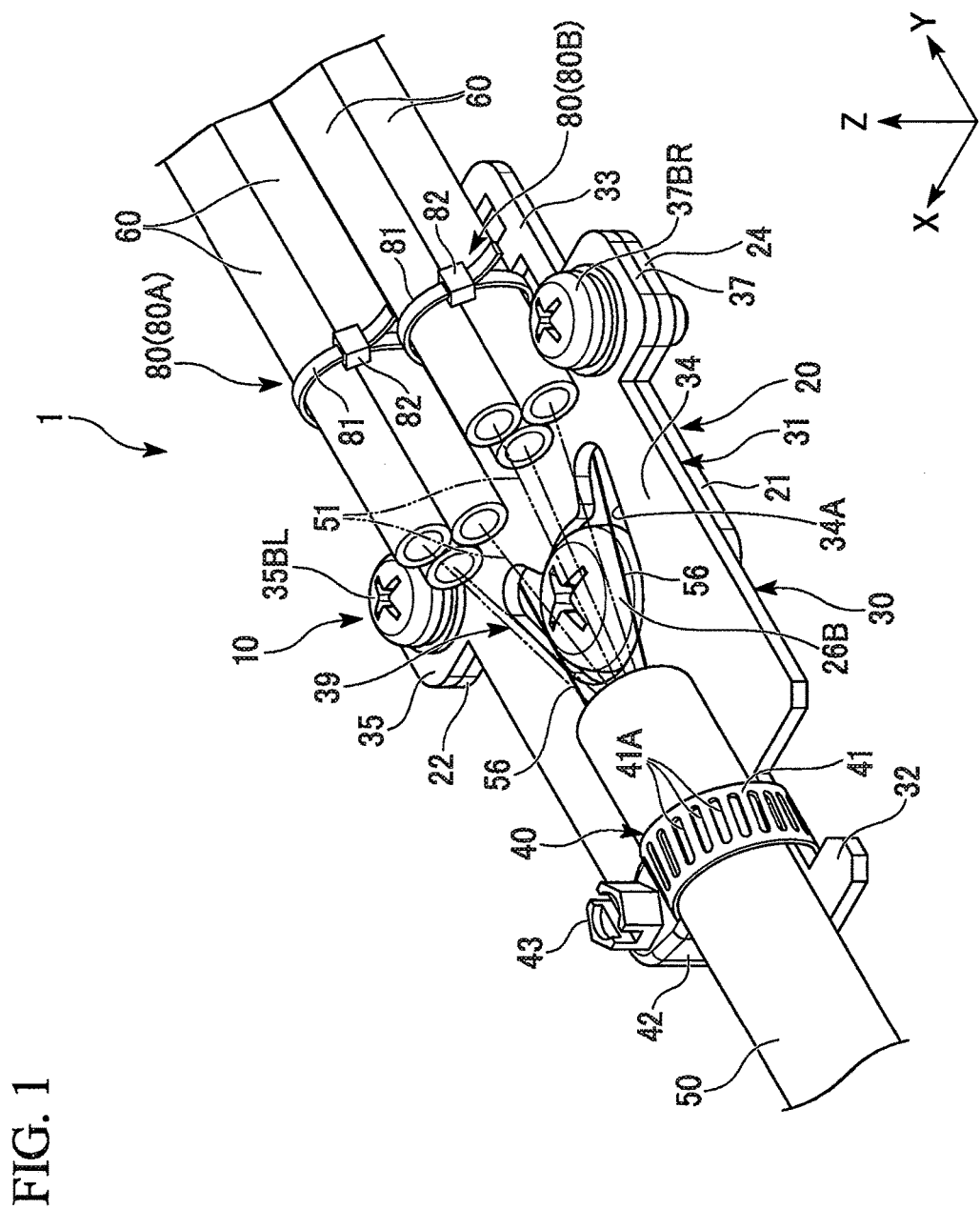
FIG. 1 is a perspective view of an optical fiber cable branch structure according to some embodiments of the present invention.
Figure 2:
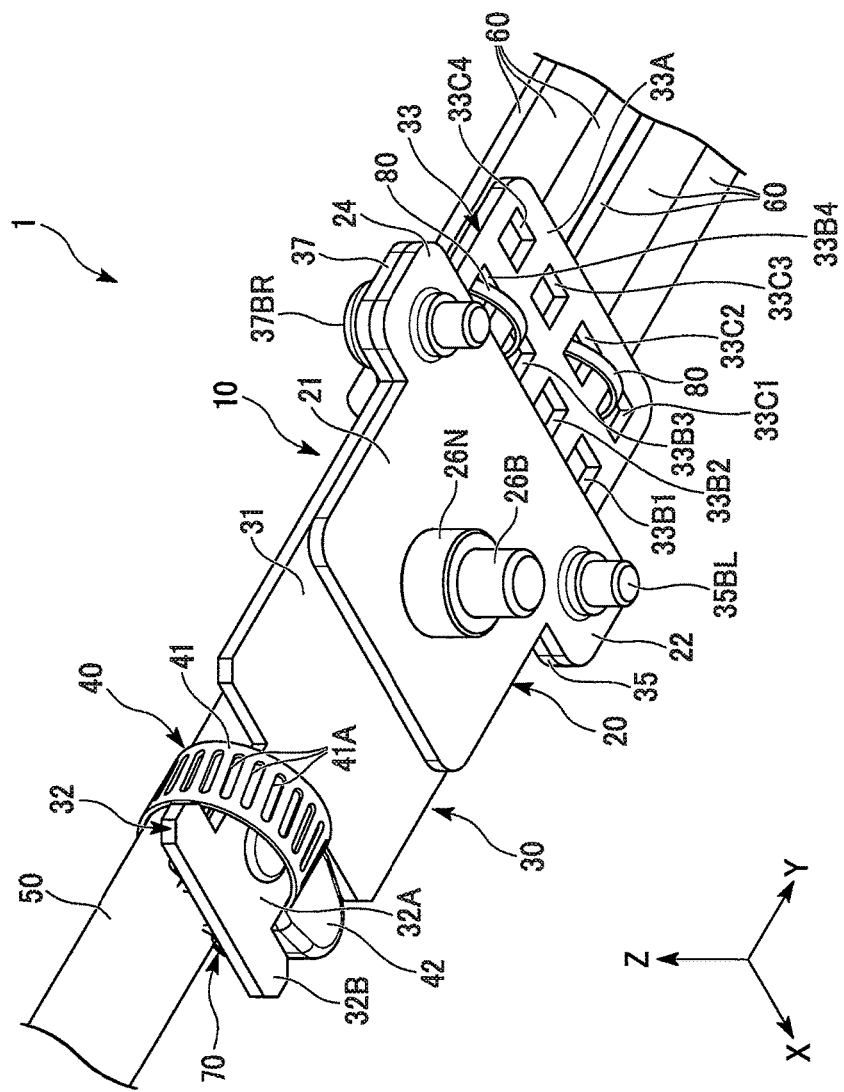
FIG. 2 is a perspective view of the optical fiber cable branch structure according to some embodiments of the present invention, viewed from the bottom side.

FIG. 1 is a perspective view of an optical fiber cable branch structure according to some embodiments of the present invention. FIG. 2 is an exploded perspective view of the optical fiber cable branch structure according to some embodiments of the present invention.

In addition, in the following description, for making the invention easily understandable, illustration in the drawings may be sometimes simplified by appropriately omitting part of components, simplifying the shapes, changing the sizes, and the like. In addition, a positional relationship of the components will be described using a set XYZ-orthogonal coordinate system. In addition, the description will be given assuming that, in the XYZ-orthogonal coordinate system, an X direction is a left-right direction, a Y direction is a front-back direction, and a Z direction is an up-down direction. Thus, the down direction (Z direction) corresponds to an extending direction of optical fibers.

Figure 6:
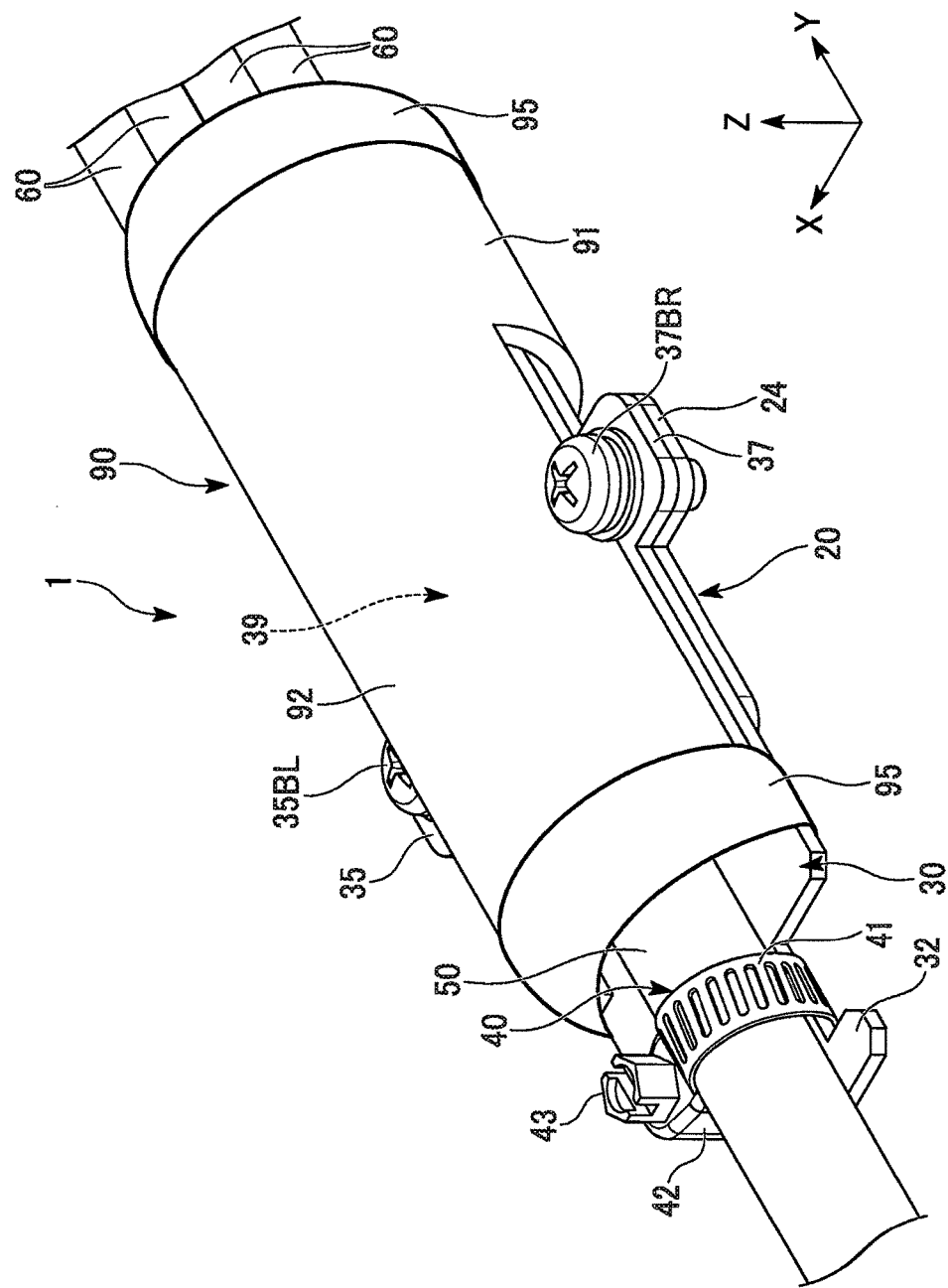
FIG. 6 is a perspective view of the optical fiber cable branch structure protected by a branch portion protection member.

As illustrated in FIGS. 1 and 2, an optical fiber cable branch structure 1 according to some embodiments of the present invention includes an optical fiber cable branch member 10, an optical fiber cable 50, protective tubes 60, and a branch portion protection member 90 (refer to FIG. 6). The optical fiber cable branch member 10 further includes a first base member 20, a second base member 30, a cable-holding ring (fastening band) 40, a retainer 70 (refer to FIG. 3), and banding bands 80.

Figure 7:
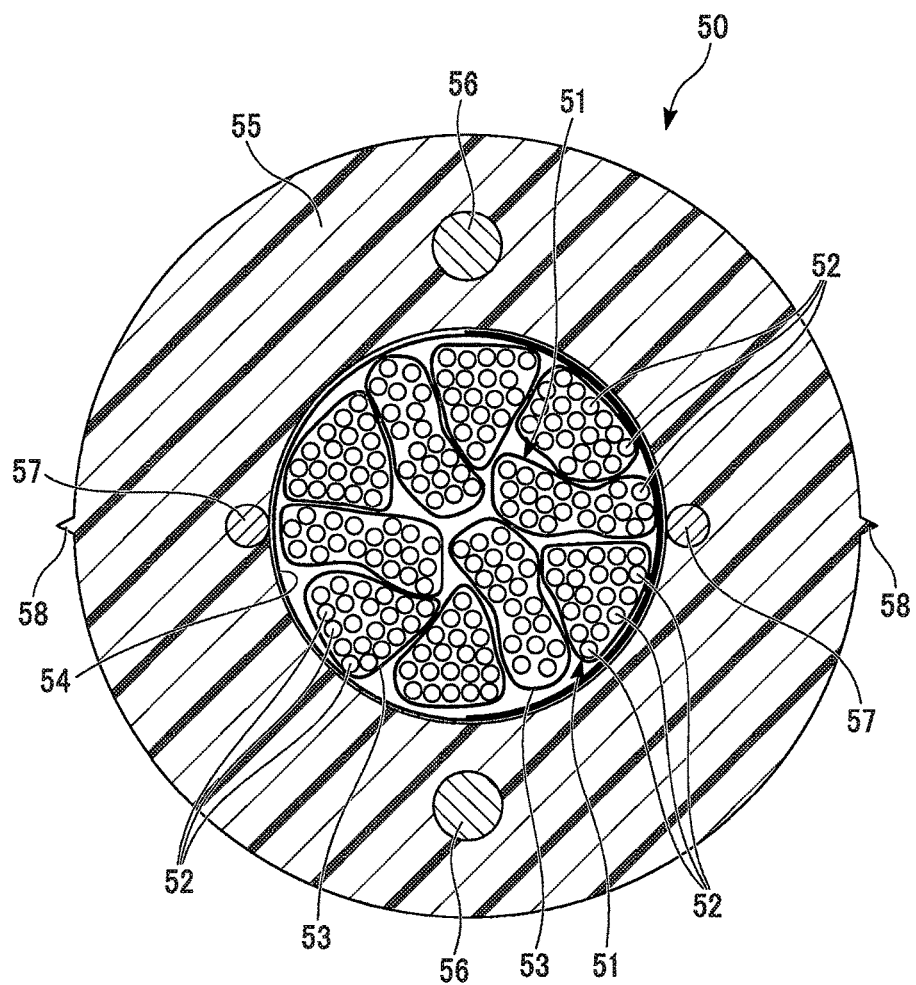
FIG. 7 is a cross-sectional view of an optical fiber cable.
Figure 8A:
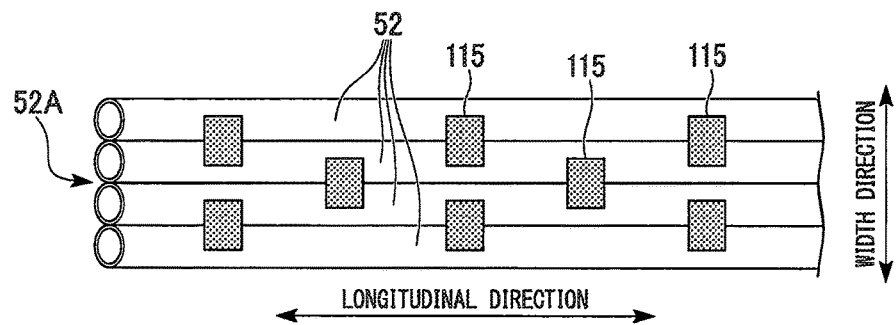
FIG. 8A is a schematic diagram of an intermittently-fixed core including four optical fibers.
Figure 8B:
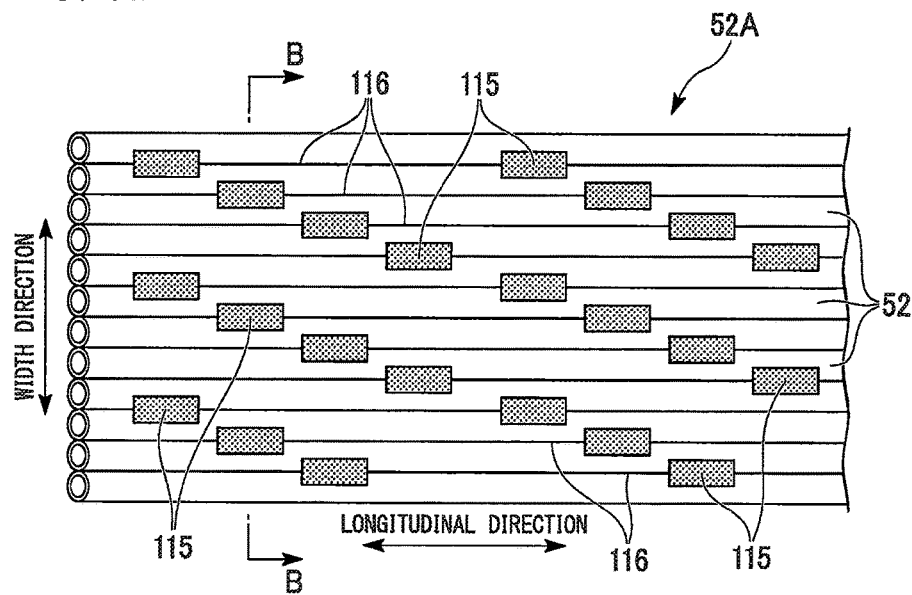
FIG. 8B is a schematic diagram of an intermittently-fixed core including twelve optical fibers.

As illustrated in FIG. 7, the optical fiber cable 50 includes an optical fiber unit bundle (first optical fiber core bundle) 51A including a plurality of sets of (e.g., ten sets of) optical fiber units 51. Each of the optical fiber units 51 includes one or more optical fibers (optical fiber cores) 52, and includes a plurality of (e.g., approximately one hundred) optical fibers 52. As illustrated in FIGS. 8A and 8B, a certain number of optical fibers 52 form an intermittently-fixed core 52A. The intermittently-fixed core 52A has a tape shape, and is formed by disposing the optical fibers 52 in a certain direction at equal pitches. The intermittently-fixed core 52A is called a spider web ribbon (SWR), and includes several (e.g., four as illustrated in FIG. 8A) optical fibers 52. Alternatively, the intermittently-fixed core 52A may include twelve optical fibers 52 as illustrated in FIG. 8B, or may include a different number of optical fibers 52.

The intermittently-fixed core 52A illustrated in FIG. 8B will be further described below. The intermittently-fixed core 52A is formed by arranging twelve optical fibers 52. Among these twelve optical fibers 52, adjacent optical fibers 52 are connected by connectors 115. The connectors 115 are disposed in a longitudinal direction of the optical fibers 52 (cable longitudinal direction) at regular intervals. With respect to a position of a connector 115 connecting adjacent optical fibers 52, a connector 115 connecting adjacent optical fibers 52 next to the adjacent optical fibers 52 is disposed at a position shifted in the longitudinal direction of the optical fibers 52. Similarly, a connector 115 connecting adjacent optical fibers 52 further next to the adjacent optical fibers 52 is disposed at a position shifted in the longitudinal direction of the optical fibers 52. In this manner, the connectors 115 are disposed in a stepwise manner in a width direction and the longitudinal direction.

Also in the intermittently-fixed core 52A including the four optical fibers 52 that is illustrated in FIG. 8A, adjacent optical fibers 52 are connected by the connectors 115. The connectors 115 are disposed in a longitudinal direction of the optical fibers 52 (cable longitudinal direction) at regular intervals. Thus, the connectors 115 provided in the intermittently-fixed core 52A including the four optical fibers 52 that is illustrated in FIG. 8A are disposed more densely than the connectors 115 provided in the intermittently-fixed core 52A including the twelve optical fibers 52 that is illustrated in FIG. 8B. In other words, the connectors 115 provided in the intermittently-fixed core 52A including the twelve optical fibers 52 that is illustrated in FIG. 8B are disposed more sparsely than the connectors 115 provided in the intermittently-fixed core 52A including the four optical fibers 52 that is illustrated in FIG. 8A.

Figures 9A, 9B:
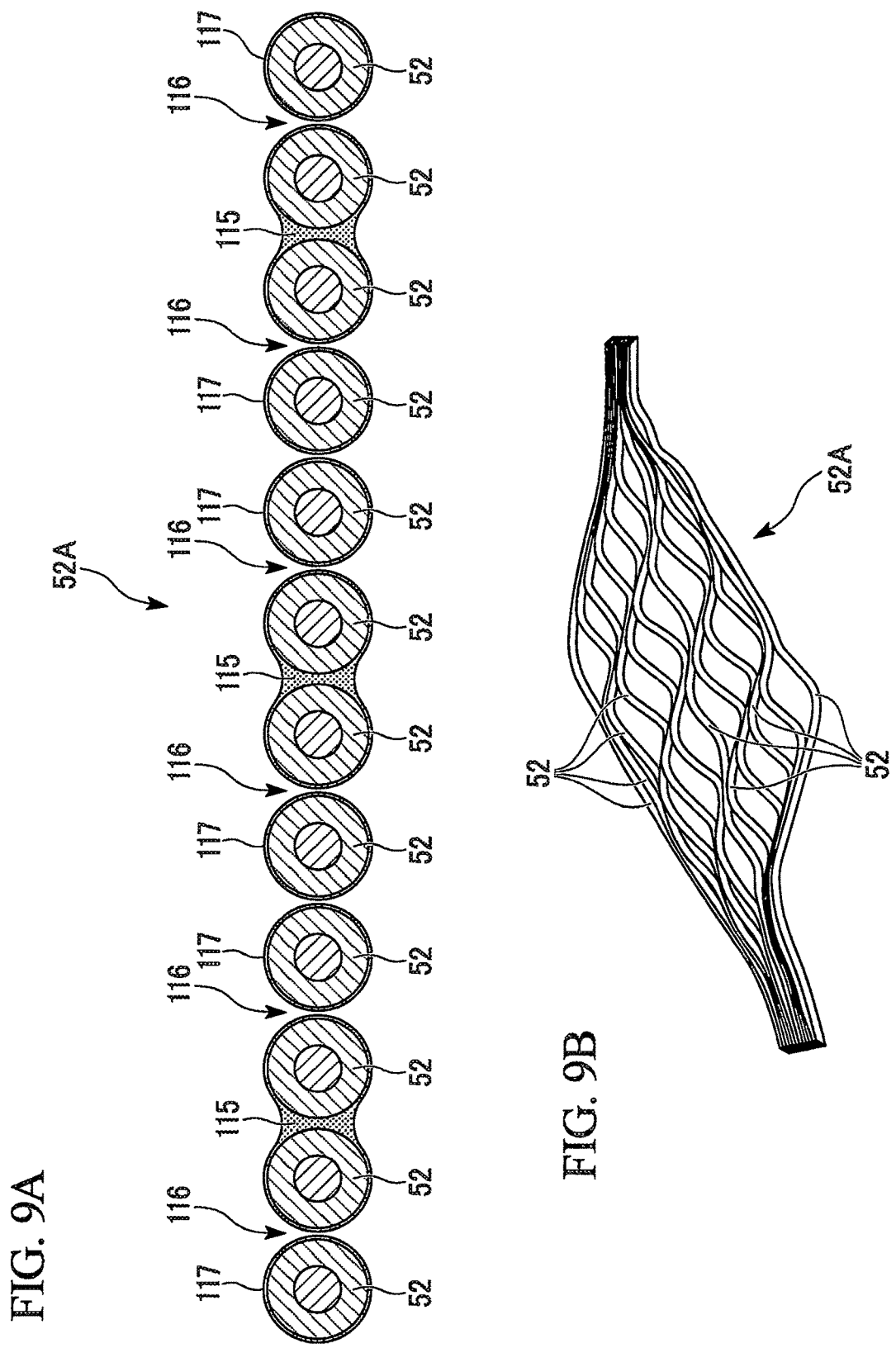
FIG. 9A is a cross-sectional view taken along a B-B line in FIG. 8B.
FIG. 9B is a diagram representing a state in which an intermittently-fixed core is spread.

As illustrated also in FIG. 9A, among adjacent optical fibers 52, adjacent optical fibers 52 connected by the connectors 115 are disposed with sandwiching the connectors 115 therebetween. Gap portions 116 are formed between adjacent optical fibers 52 other than the adjacent optical fibers 52 connected by the connectors 115. The widths of the connectors 115 and the gap portions 116 that are provided between the adjacent optical fibers 52 are substantially equal. Thus, the widths of the adjacent optical fibers 52 are substantially constant. The optical fibers 52 are covered by resin layers 117.

In the intermittently-fixed core 52A, the adjacent optical fibers 52 are connected by the connectors 115 disposed in a stepwise manner in the width direction and the longitudinal direction. Thus, the intermittently-fixed core 52A has structured in such a manner as to spread like a net (like a spider web) as illustrated in FIG. 9B, by being pulled from a longitudinal direction halfway position in a direction perpendicular to the extending direction.

The optical fiber unit 51 is formed by an aggregate of optical fibers 52 that is obtained by bundling a predetermined number of intermittently-fixed cores 52A using a banding member (bundling member) 53. The banding members 53 are colored in colors different for the respective optical fiber units 51. Thus, the optical fiber unit 51 can be identified based on the color of the banding member 53. As illustrated in FIG. 7, the optical fiber unit bundle 51A is wrapped by a wrapping tube 54 formed by a water absorption tape.

The optical fiber cable 50 has a jacket (outer cover) 55 and tension resistance members 56. The jacket 55 covers the wrapping tube 54 wrapping the optical fiber unit bundle 51A, and coats the outer circumference of the optical fibers 52. The tension resistance members 56 are provided at positions adjacent to the inner side of the jacket 55. The tension resistance members 56 are buried in the longitudinal direction of the optical fiber cable 50. The tension resistance members 56 are respectively buried at a 12 o'clock position located at an upper end, and a six o'clock position located at a lower end, when viewed in the cross section of the optical fiber cable 50.

Furthermore, ripping cords 57 are provided at positions proximate to the internal surface of the jacket 55. The ripping cords 57 are laid in the extending direction of the optical fibers 52. The ripping cords 57 are respectively disposed at a three o'clock position located on the right side, and a nine o'clock position located at the left side, when viewed in the cross section of the optical fiber cable 50. Ridged marker protrusions 58 are provided on the outside of the positions in the jacket 55 where the ripping cords 57 are disposed. The marker protrusions 58 are formed along the ripping cords 57, and guide buried positions of the ripping cords 57. In addition, the ripping cords 57 and the marker protrusions 58 need not be provided.

Figure 3:
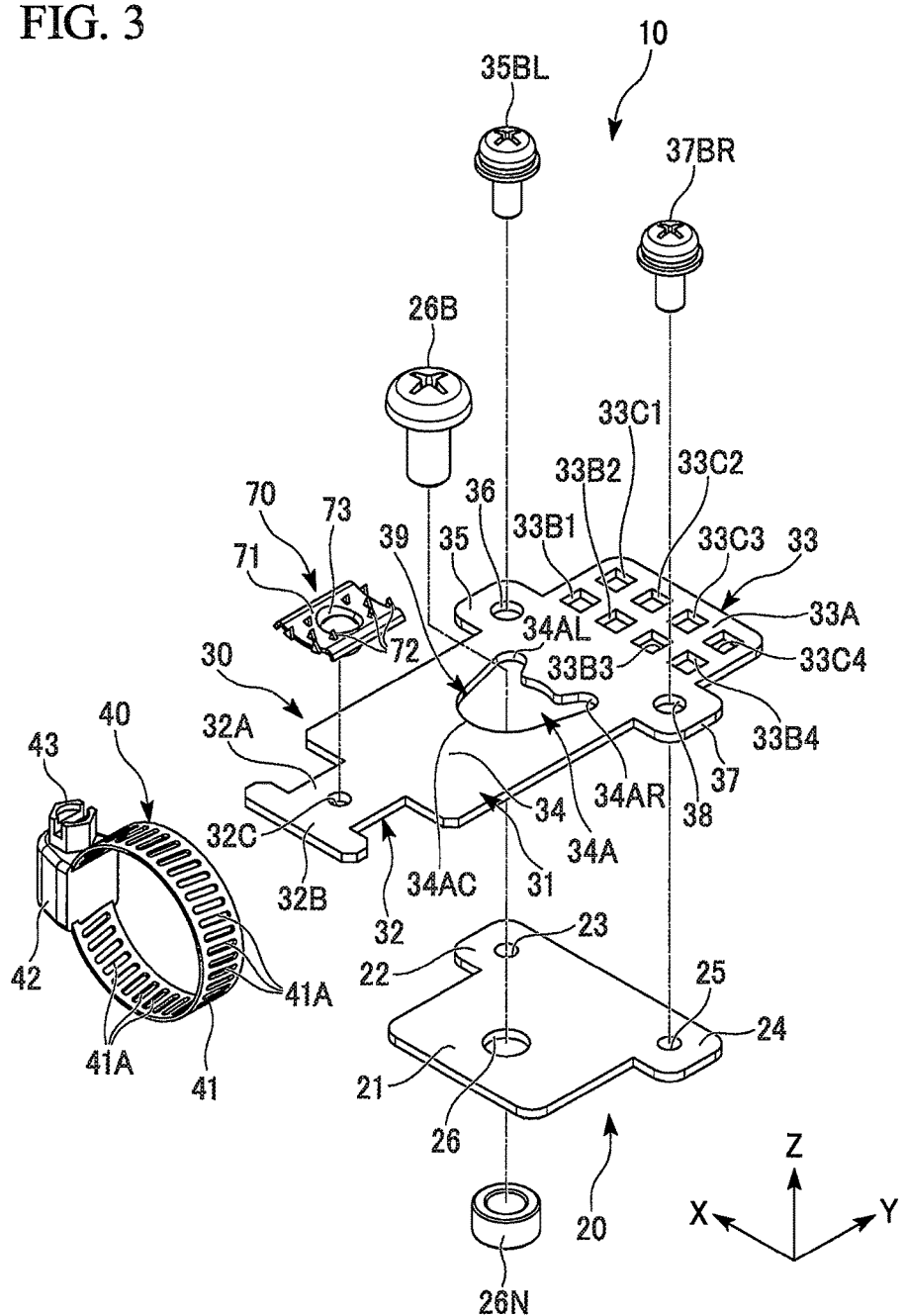
FIG. 3 is an exploded perspective view of an optical fiber cable branch member according to some embodiments of the present invention.

The first base member (branch member main body, first member) 20 is a metal plate material, and has electrical conductivity. As illustrated in FIG. 3, the first base member 20 includes a rectangular first plate (plate material) 21. A first left attachment portion (joint portion) 22 is provided on the left side in the rear-end portion of the first plate 21, and the first left attachment portion 22 is provided with a first left bolt hole 23. In addition, a first right attachment portion 24 is provided on the right side in the rear-end portion of the first plate 21, and the first right attachment (joint portion) 24 is provided with a first right bolt hole 25. In addition, a through-hole (main body-fixing portion) 26 is provided at the center portion of the first plate 21.

The second base member (branch member main body, second member) 30 is a metal plate material, and has electrical conductivity. The second base member 30 includes a rectangular second plate (plate material) 31. At the leading end portion of the second plate 31, a cable-fixing portion 32 is provided at the front portion. A tube-fixing portion 33 is provided at the rear portion of the second plate 31. In the second plate 31, a center portion 34 is provided between the cable-fixing portion 32 and the tube-fixing portion 33. In the center portion 34, a through-hole 34A is formed.

In addition, a second left attachment portion (joint portion) 35 is provided on the left side in the end portion on the tube-fixing portion 33 side in the center portion 34, and the second left attachment portion 35 is provided with a second left bolt hole 36. In addition, a second right attachment portion (joint portion) 37 is provided on the right side in the end portion on the tube-fixing portion 33 side in the center portion 34, and the second right attachment portion 37 is provided with a second right bolt hole 38. A branch region 39 is formed above the center portion 34. In the branch region 39, the optical fiber cable 50 is branched into a plurality of sets of optical fiber units 51 extending from the end portion of the optical fiber cable 50.

An optical fiber core bundle obtained by branching a plurality of optical fibers 52 extending from the end portion of the optical fiber cable 50 is only required to include one or more optical fiber cores. In the above-described example, the optical fiber core bundle corresponds to the optical fiber unit 51. Nevertheless, the optical fiber core bundle may correspond to one intermittently-fixed core 52A or one optical fiber 52 that is obtained by unbinding the optical fiber unit 51. Alternatively, the optical fiber core bundle may correspond to a plurality of intermittently-fixed cores 52A or optical fibers 52 obtained by unbinding the optical fiber unit 51. Alternatively, the optical fiber core bundle may correspond to a plurality of intermittently-fixed cores 52A or optical fibers 52 that are gathered from a plurality of optical fiber units 51.

A rear part of the cable-fixing portion 32 forms a narrow width portion 32A (band attachment portion), and a front part thereof forms a wide width portion 32B. A left-right direction width of the narrow width portion 32A is made narrower than a left-right direction width of the wide width portion 32B. In addition, the left-right direction width of the wide width portion 32B is made narrower than a left-right direction width of the second plate 31. A through-hole 32C is provided in the narrow width portion 32A of the cable-fixing portion 32.

The tube-fixing portion 33 includes a plate portion 33A, and the plate portion 33A is provided with a plurality of (eight in this example) adjustment holes (attachment holes) 33B1 to 33B4 and 33C1 to 33C4. The adjustment holes 33B1 to 33B4 and 33C1 to 33C4 are provided in the plate portion 33A in a parallel state in the front-back and left-right directions.

On the front part in the plate portion 33A, four front side first adjustment hole 33B1, front side second adjustment hole 33B2, front side third adjustment hole 33B3, and front side fourth adjustment hole 33B4 are provided from the left side. On the rear part in the plate portion 33A, four rear side first adjustment hole 33C1, rear side second adjustment hole 33C2, rear side third adjustment hole 33C3, and rear side fourth adjustment hole 33C4 are provided from the left side.

The through-hole 34A provided in the center portion 34 includes a large-diameter portion 34AC, a left small-diameter portion 34AL, and a right small-diameter portion 34AR. The large-diameter portion 34AC is disposed at a substantially-center portion in the left-right direction of the center portion 34. The left small-diameter portion 34AL is disposed at the left side rearward of the large-diameter portion 34AC. The right small-diameter portion 34AR is disposed at the right side rearward of the large-diameter portion 34AC.

The large-diameter portion 34AC is an opening having an area larger than that of the left small-diameter portion 34AL and the right small-diameter portion 34AR. The left small-diameter portion 34AL and the right small-diameter portion 34AR are openings having substantially-equal shapes and substantially-equal areas.

A left bolt 35BL penetrates through the second left bolt hole 36 provided in the second left attachment portion 35. The left bolt 35BL is screwed in the first left bolt hole 23 provided in the first left attachment portion 22 of the first base member 20. A right bolt 37BR penetrates through the second right bolt hole 38 provided in the second right attachment portion 37. The right bolt 37BR is screwed in the first right bolt hole 25 provided in the first right attachment portion 24 of the first base member 20. By the left bolt 35BL and the right bolt 37BR being respectively screwed into the first left bolt hole 23 and the first right bolt hole 25, the first base member 20 and the second base member 30 are joined.

In addition, the through-hole 26 is formed at a position in the first base member 20 that corresponds to the through-hole 34A of the second base member 30. A thread portion of a fastening bolt (main body-fixing portion) 26B penetrates through the through-hole. A fastening nut (main body-fixing portion) 26N illustrated in FIG. 2 is fastened to the thread portion of the fastening bolt 26B.

A region between the cable-fixing portion 32 and the tube-fixing portion 33 is regarded as an exposed placement region. In the exposed placement region, the optical fiber units 51 are sometimes brought into an exposed state. In this embodiment, in the exposed placement region, the optical fiber units 51 are covered and protected by the branch portion protection member 90.

Figure 10:
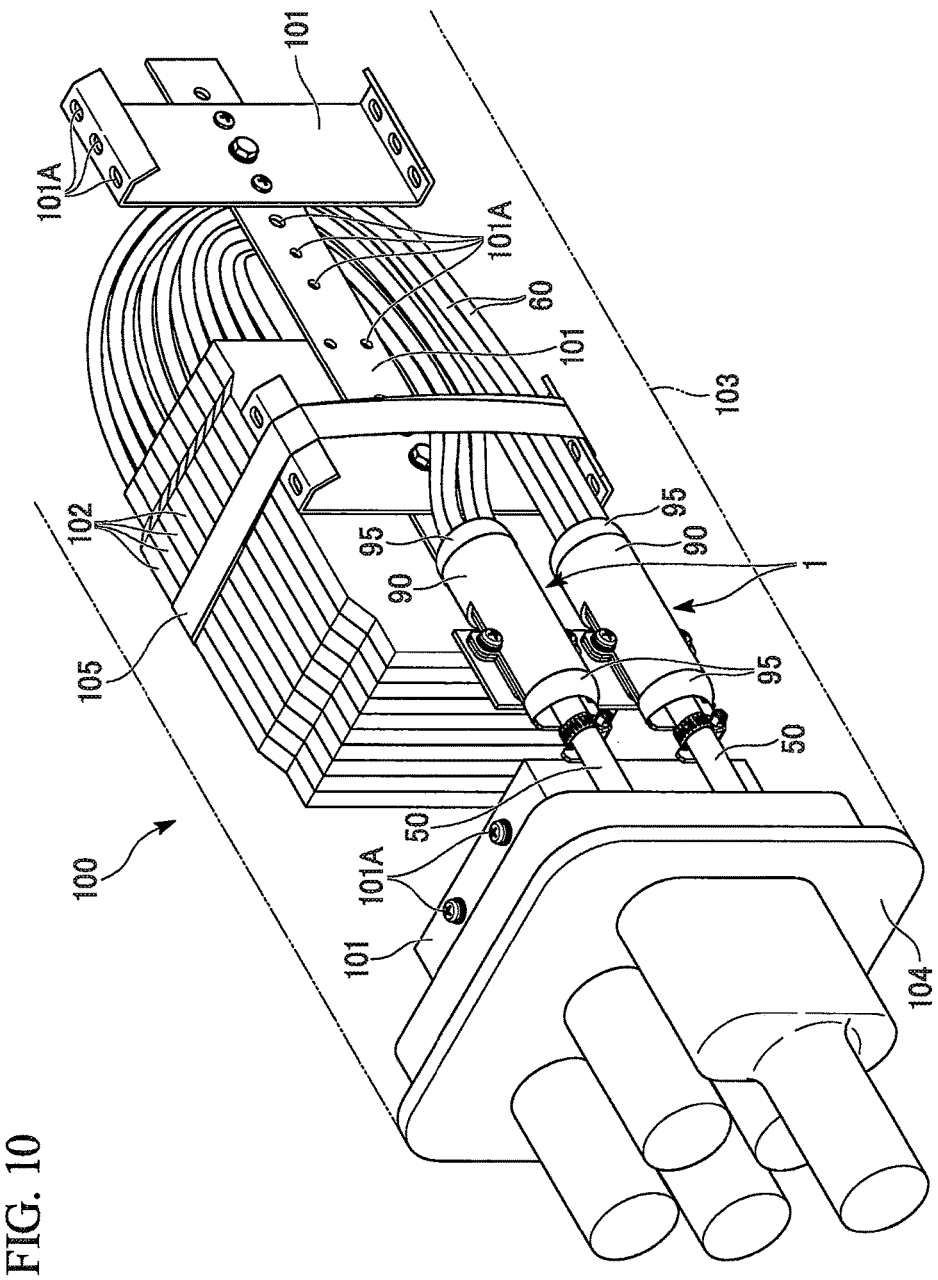
FIG. 10 is a perspective view of a closure to which the optical fiber cable branch structure is attached.

As illustrated in FIG. 10, the above-described optical fiber cable branch structure 1 is used by being attached to a closure 100, for example. The closure 100 is a so-called pot-type closure one side of which optical fibers are introduced into, and derived from. The closure 100 includes frames (objects to be attached, metal members) 101, a fused portion accommodation tray 102, a closure sleeve 103, and an end surface plate 104. In the closure 100, the optical fiber cables 50 are introduced into the closure sleeve 103 via the end surface plate 104. One side of the closure sleeve 103 is opened, and the other end thereof is blocked. The end surface plate 104 is attached to an opening portion on one side, so that the opening portion is blocked. In addition, a plurality of the fused portion accommodation trays 102 are provided, and the plurality of fused portion accommodation trays 102 are banded by a band member 105.

The frames 101 are respectively provided on the internal surface of the end surface plate 104 and the internal surface of the closure sleeve 103. The frames 101 are made of metal, and electrically-grounded to the ground surface via an earth cable (not illustrated). The optical fiber cable branch structures 1 are attached to the frames 101. The optical fiber cables 50 introduced into the closure sleeve 103 are branched into optical fiber units (second optical fiber core bundles) 51 in the optical fiber cable branch structure 1. The branched optical fiber units 51 are introduced into the fused portion accommodation trays 102 with being covered by the protective tubes 60.

The frame 101 of the closure 100 is disposed on a surface opposite to a surface of the first base member 20 that faces the second base member 30. A through-hole through which the thread portion of the fastening bolt 26B penetrates is formed in the frame 101. The first base member 20 and the frame 101 are overlapped, the thread portion of the fastening bolt 26B is inserted into the through-holes of the first base member 20 and the frame 101, and the fastening nut 26N is fastened to the thread portion. In this manner, the first base member 20 and the frame 101 are sandwiched by a head portion of the fastening bolt 26B and the fastening nut 26N, so that the first base member 20 is fixed onto the frame 101.

The cable-holding ring 40 includes a fastening portion 41, a thread installation portion 42, and a thread portion 43. The fastening portion 41 is a metal circular ring. A plurality of hole portions 41A are provided in the fastening portion 41. The plurality of hole portions 41A are disposed at substantially-equal intervals in a circumferential direction. The thread installation portion 42 is a casing, and one end of the fastening portion 41 is fixed thereto.

The thread portion 43 is installed in the thread installation portion 42. The thread portion 43 can be rotated by being operated by an operator or the like. The thread portion 43 is connected to a gear wheel (not illustrated) provided in the thread installation portion 42. Wheel teeth of the gear wheel enter a plurality of hole portions 41A provided in the fastening portion 41. If the thread installation portion 42 is rotated clockwise, for example, hole portions 41A that the gear wheel enters move in one direction, so that the fastening portion 41 is fastened, and the diameter thereof is reduced. If the thread installation portion 42 is rotated counterclockwise (in a direction opposite to the clockwise direction), hole portions 41A that the gear wheel enters move in an opposite direction, so that the fastening portion 41 is loosened, and the diameter thereof is expanded.

The fastening portion 41 can be fastened with binding the optical fiber cable 50 and the narrow width portion 32A of the cable-fixing portion 32. The optical fiber cable 50 is fastened together with the narrow width portion 32A of the cable-fixing portion 32 by the fastening portion 41 having a reduced diameter, to be fixed onto the cable-fixing portion 32. Together with the cable-holding ring 40, the cable-fixing portion 32 holds and fixes the end portion of the jacket 55 of the optical fiber cable 50 onto the second base member 30.

The wide width portion 32B provided on the front part of the cable-fixing portion 32 is wider than the narrow width portion 32A. The wide width portion 32B therefore prevents the optical fiber cable 50 from dropping out by the fastening portion 41 falling off frontward. In addition, the second plate 31 provided on the rear part of the cable-fixing portion 32 is wider than the narrow width portion 32A. The second plate 31 therefore prevents the optical fiber cable 50 from dropping out by the fastening portion 41 falling off rearward.

The retainer 70 is a metal member, and is fixed on the cable-fixing portion 32 of the second base member 30. The retainer 70 includes a plate portion 71, pointed teeth 72, and a fixing pin 73. The plate portion 71 is attached onto the narrow width portion 32A of the cable-fixing portion 32 in the second base member 30. On the top surface of the plate portion 71, a hollow formed into an arch having an axis extending in the cable longitudinal direction is provided. The diameter of the hollow is set to be substantially equal to the diameter of the optical fiber cable 50. The optical fiber cable 50 is disposed along the hollow provided on the top surface of the plate portion 71.

The pointed teeth 72 are provided on the top surface of the plate portion 71. The pointed teeth 72 are projection portions protruding upward. The pointed teeth 72 have a sharp-pointed shape so as to bite into the jacket 55 of the optical fiber cable 50. The length of the pointed teeth 72 is set to be shorter than the thickness of the jacket 55 of the optical fiber cable 50.

The fixing pin 73 is provided on the bottom surface of the plate portion 71. The fixing pin 73 can penetrate through the through-hole 32C provided in the narrow width portion 32A of the cable-fixing portion 32. The fixing pin 73 is inserted into the through-hole 32C from above the narrow width portion 32A, and is folded back on the bottom surface side of the narrow width portion 32A. By the fixing pin 73 being folded back, the plate portion 71 is fixed onto the narrow width portion 32A of the cable-fixing portion 32.

Figure 4:
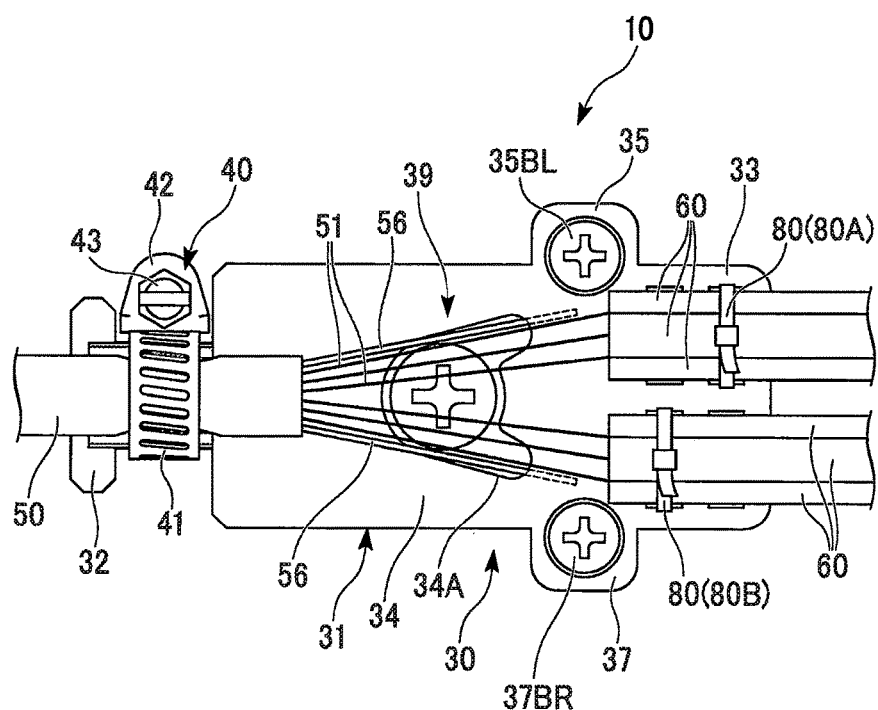
FIG. 4 is a plan view of the optical fiber cable branch structure according to some embodiments of the present invention.

The tension resistance members 56 extend from the end portion of the jacket 55 of the optical fiber cable 50 held by the cable-holding ring 40. As illustrated in FIG. 4, the tension resistance members 56 are guided to a space between the first plate 21 and the second plate 31 via the left small-diameter portion 34AL and the right small-diameter portion 34AR of the through-hole 34A formed in the center portion 34 of the second plate 31. The first plate 21 and the second plate 31 are joined by a first bolt B1 and a second bolt B2 being respectively screwed into the first left bolt hole 23 and the first right bolt hole 25. In this manner, the first plate 21 and the second plate 31 sandwich and hold the tension resistance members 56. The tension resistance members 56 are sandwiched and fixed by the first plate 21 and the second plate 31.

Figure 5:
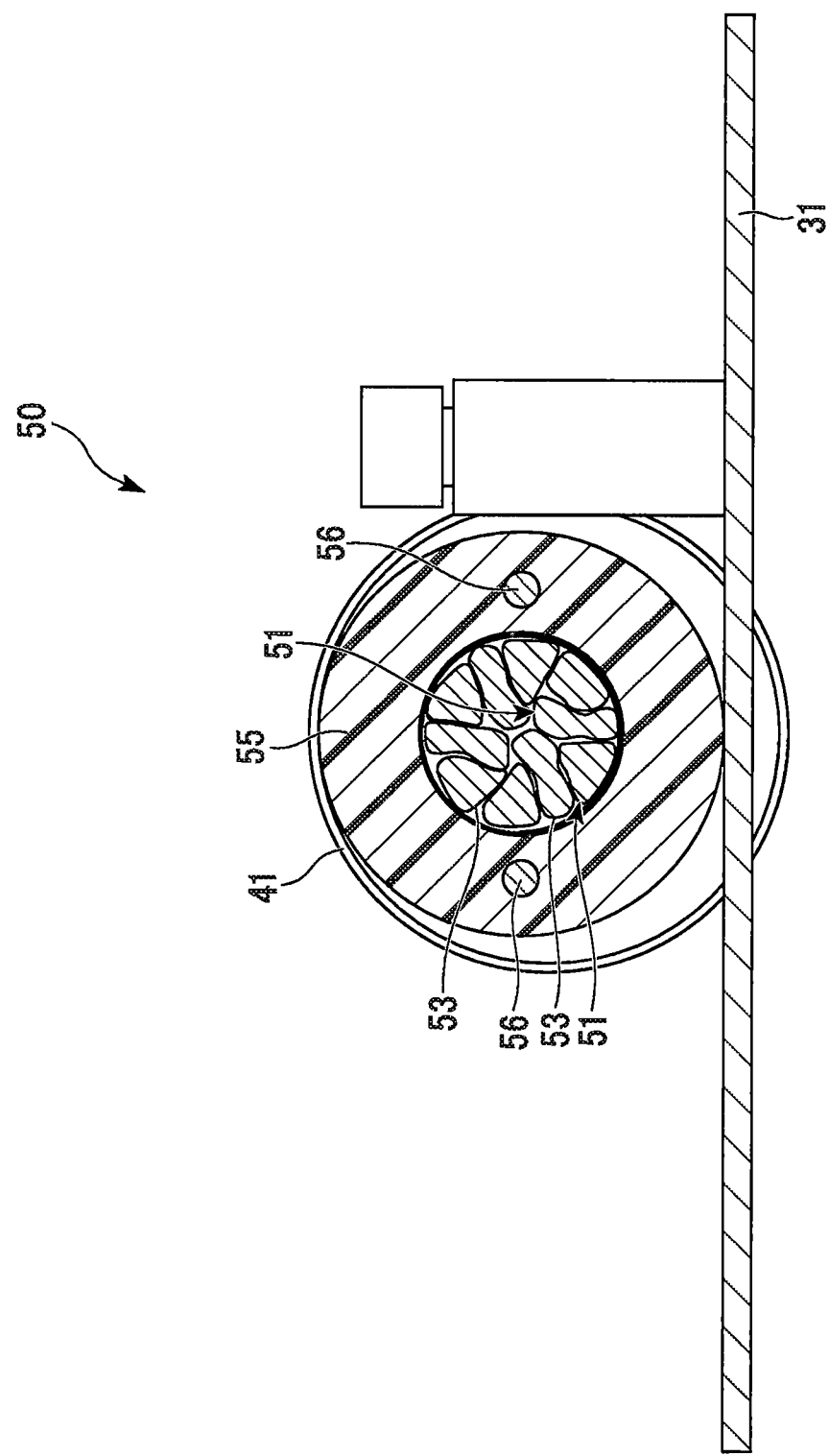
FIG. 5 is a cross-sectional view of a state in which an optical fiber cable is attached to a cable-fixing portion.

As illustrated in FIG. 5, the two tension resistance members 56 buried in the jacket 55 have a substantially-equal distance from the second plate 31. In other words, a line segment connecting the tension resistance members 56 that is obtainable when the two tension resistance members 56 are cut along a cut plane perpendicular to the longitudinal direction of the optical fibers 52 is substantially parallel to a line extending along the top surface of the second plate 31 (horizontal line).

The banding band 80 is a resin member. The banding band 80 includes a band portion 81 and a retaining portion 82. The band portion 81 forms a cord-like member, and the size of the cross section thereof is set to such a thickness as to be insertable into the adjustment holes 33B1 to 33B4 and 33C1 to 33C4 of the tube-fixing portion 33 provided in the second base member 30.

The retaining portion 82 is disposed at a halfway position in a length direction of the band portion 81. The band portion 81 is inserted into the retaining portion 82, and the band portion 81 can be fastened or loosened according to a position where the retaining portion 82 retains the band portion 81. The banding band 80 is inserted into any of the adjustment holes 33B1 to 33B4 and 33C1 to 33C4, and bands a plurality of the protective tubes 60 by the size being adjusted by the retaining portion 82. In this manner, the tube-fixing portion 33 and the banding band 80 fix the plurality of protective tubes 60 onto the second base member 30.

Six protective tubes 60 are fixed on the second base member 30. Among these six protective tubes 60, every three protective tubes 60 are banded by one banding band 80. Among these six protective tubes 60, three protective tubes 60 are banded by a first banding band 80A, and the other three protective tubes are banded by a second banding band 80B.

The first banding band 80A is inserted into the front side first adjustment hole 33B1 and the front side second adjustment hole 33B2 that are disposed on the front side and on the left side from the center. The second banding band 80B is inserted into the rear side third adjustment hole 33C3 and the rear side fourth adjustment hole 33C4 that are disposed on the rear side and on the right side from the center. The three protective tubes 60 banded by the first banding band 80A are banded at a position close to the left side from the center of the second base member 30. The three protective tubes 60 banded by the second banding band 80B are banded at a position close to the right side from the center of the second base member 30. The protective tubes 60 banded by the first banding band 80A and the protective tubes 60 banded by the second banding band 80B are disposed with being separated into the left and right.

The protective tubes 60 are members having flexibility that are made of resin, for example. The protective tubes 60 are formed of various whitish materials, and in one optical fiber cable branch member 10, the protective tubes 60 having different colors are used. In addition, the protective tubes 60 may be formed of transparent or semi-transparent material. The protective tubes 60 are respectively put over a plurality of optical fiber units 51 branched in the branch region 39. The colors of the protective tubes 60 respectively put over the plurality of optical fiber units 51 are different from each other. This makes the optical fiber units 51 easily-distinguishable.

The branch portion protection member 90 is a member having flexibility and stretch properties that is made of resin, for example, and is formed of transparent or semi-transparent material. Nevertheless, the branch portion protection member 90 may have another color such as black color and white color. The branch portion protection member 90 includes a front semicylinder portion 91 and a rear semicylinder portion 92. The front semicylinder portion 91 and the rear semicylinder portion 92 have an equal diameter, and the diameter of the rear semicylinder portion 92 is set to be shorter than the length in the width direction of the second plate 31 in the second base member 30.

As illustrated in FIG. 6, the branch portion protection member 90 is attached to the second base member 30 by the rear semicylinder portion 92 covering the entire periphery of the tube-fixing portion 33. The rear semicylinder portion 92 of the branch portion protection member 90 extends to cover the tube-fixing portion 33. The front semicylinder portion 91 of the branch portion protection member 90 covers the branch region 39 in the second plate 31. In the branch region 39, the branch portion protection member 90 covers and protects, from above, the optical fibers 52 extending from the end portion of the optical fiber cable 50.

Vinyl tapes 95 are winded around both of the leading end portion and the rear-end portion of the branch portion protection member 90. By the vinyl tape being winded around the leading end portion of the branch portion protection member 90, the leading end portion prevents the optical fibers 52 from being exposed from the branch portion protection member 90. By the vinyl tape 95 being winded around the rear-end portion of the branch portion protection member 90, the rear-end portion is compressed inward in a radial direction to fasten the protective tubes 60.

As illustrated in FIG. 10, in the optical fiber cable branch structure 1 disposed inside the closure sleeve 103, the branch portion protection member 90 is provided to protect the branch region 39. In addition, when the optical fiber cable branch structure 1 is disposed inside the closure sleeve 103, the branch portion protection member 90 needs not be provided.

In the above-described optical fiber cable branch structure 1, the tension resistance members 56 of the optical fiber cable 50 are provided inside the jacket 55. Thus, it is assumed that, by the jacket 55 being peeled off, the tension resistance members 56 are exposed, and fail to be fixed. In view of this point, the above-described optical fiber cable branch structure 1 includes the first plate 21 and the second plate 31 that hold the tension resistance members 56. Thus, by the first plate 21 and the second plate 31 sandwiching and holding the tension resistance members 56, the tension resistance members can be fixed to the first base member 20 and the second base member 30. Thus, when the tension resistance members are stably fixed in the optical fiber cable 50 in which the tension resistance members 56 are provided in the jacket 55, the tension resistance members 56 can be stabilized.

In addition, the tension resistance members 56 are held by the first plate 21 and the second plate 31.

Thus, the tension resistance members can be easily fixed. In addition, because an additional member for fixing the tension resistance members 56 is not required, an increase in the number of components can be suppressed.

In addition, the first plate 21 is made of metal, and the first plate 21 is in contact with the frame 101 of the closure 100 and electrically-connected thereto. By being held by the first plate 21 and the second plate 31, the tension resistance members 56 are in contact with the first plate 21. In addition, the frame 101 of the closure 100 is a conductive member electrically-connected to a grounding cable (not illustrated).

Thus, the tension resistance members 56 can be electrically-grounded via the first plate 21 and the frame 101 of the closure 100. In addition, in the above-described optical fiber cable branch structure 1, the first plate 21 is attached to the frame 101 of the closure 100. Nevertheless, the first plate 21 may be attached to another conductive member being different from the frame 101.

In addition, the first base member 20 includes the first plate 21 being a conductive member, and the tension resistance members 56 are electrically-connected to the frame 101 of the closure 100 via the first plate 21. Thus, because the tension resistance members 56 can be grounded only by the tension resistance members 56 being electrically-connected to the first plate 21 of the first base member 20, the tension resistance members can be easily grounded.

In addition, the through-hole 34A is formed in the center portion 34 of the second plate 31 in the second base member 30. Thus, the tension resistance members 56 can be easily guided from above the second plate 31 to a space between the second plate 31 and the first plate 21.

In addition, the through-hole 34A is provided with the left small-diameter portion 34AL and the right small-diameter portion 34AR. By respectively guiding the tension resistance members 56 to the left small-diameter portion 34AL and the right small-diameter portion 34AR, the tension resistance members can be guided to positions where the tension resistance members are difficult to contact the optical fiber units 51 and the like.

In addition, the connectors 115 provided in the intermittently-fixed core 52A including the twelve optical fibers 52 that is illustrated in FIG. 8B are disposed more sparsely than the connectors 115 provided in the intermittently-fixed core 52A including the four optical fibers 52 that is illustrated in FIG. 8A. Thus, when the optical fibers 52 are viewed in the width direction, the number of times the connectors 115 traverse the optical fibers 52 is reduced. Thus, because the intermittently-fixed core 52A can be made more flexible, the loss of cores that is caused when the intermittently-fixed core 52A is unbound to the optical fibers 52 can be reduced.

In addition, as illustrated in FIG. 5, the two tension resistance members 56 buried in the jacket 55 of the optical fiber cable 50 have a substantially-equal distance from the second plate 31. Thus, the optical fiber cable 50 can be made easily-bendable in a direction vertical to the top surface of the second plate 31 (direction rotating around a horizontal line vertical to the cable longitudinal direction).

In addition, because the tension resistance members 56 are buried in the jacket 55, the optical fiber cable 50 can be fixed onto the optical fiber cable branch member 10 without regard to the arrangement of the tension resistance members 56. Thus, workability in fixing the optical fiber cable 50 onto the optical fiber cable branch member 10 can be enhanced, and this can contribute to a reduction in workload, and the shortening of working hours.

An attachment procedure in attaching the optical fiber cable branch structure 1 to the closure 100 will be described below. In addition, the description will be given assuming that an operator performs an attaching operation.

As illustrated in FIG. 10, the frame 101 is provided with a plurality of through-holes 101A. A through-hole (not illustrated) is also provided at a position on the frame 101 illustrated in FIG. 10 where the optical fiber cable branch structure 1 is attached. The optical fiber cable branch structure 1 is attached to the frame 101 by the thread portion of the fastening bolt 26B (refer to FIG. 2) penetrating through the through-hole.

Before the optical fiber cable branch structure 1 is attached to the frame 101 of the closure 100, the first plate 21 and the second plate 31 are separated. The operator first attaches the first plate 21 to the frame 101. The operator disposes the first plate 21 and the frame 101 so that through-holes respectively provided in the first plate 21 and the frame 101 become coaxial. The operator inserts the thread portion of the fastening bolt 26B from the first plate 21 side into the through-holes of the first plate 21 and the frame 101.

Subsequently, the operator fastens the fastening nut 26N to the thread portion of the fastening bolt 26B from the frame 101 side. In this manner, the operator fixes the first plate 21 onto the frame 101.

While attaching the first plate 21 to the frame 101, or after attaching the first plate 21 to the frame 101, the operator fixes the optical fiber cable 50 onto the second plate 31. Before fixing the optical fiber cable 50 onto the second plate 31, the operator lets the optical fiber cable 50 into the fastening portion 41 of the cable-holding ring 40. In addition, the operator lets the protective tubes 60 through by causing the optical fibers 52 to extend from the end portion of the optical fiber cable 50.

Then, the operator stacks the optical fiber cable 50 on the cable-fixing portion 32 of the second plate 31. At this time, the operator causes the jacket 55 of the optical fiber cable 50 to lightly bite into the pointed teeth 72 of the retainer 70 fixed on the cable-fixing portion 32.

Subsequently, the operator lets the optical fiber cable 50 and the narrow width portion 32A of the cable-fixing portion 32 into the cable-holding ring 40, and fastens the fastening portion 41 of the cable-holding ring 40 to reduce the diameter. In this manner, using the fastening portion 41 of the cable-holding ring 40, the operator fastens the optical fiber cable 50 and the narrow width portion 32A of the cable-fixing portion 32 together.

At this time, the pointed teeth 72 of the retainer 70 bite into the jacket 55 of the optical fiber cable 50. Thus, the optical fiber cable 50 is tightly fixed onto the cable-fixing portion 32. After that, the operator attaches the branch portion protection member 90 to the second base member 30. In this manner, the protective tubes 60 and the optical fibers 52 in the branch region 39 of the second base member 30 are protected. The branch region 39 corresponds to placement positions of the optical fiber units 51 protected by the protective tubes 60.

After that, the operator bands the protective tubes 60 using the banding bands 80 inserted into the adjustment holes 33B1 to 33B4 and 33C1 to 33C4. Subsequently, the operator joins the first plate 21 and the second plate 31. When joining the first plate 21 and the second plate 31, the operator tightens the left bolt 35BL and the right bolt 37BR.

The left bolt 35BL and the right bolt 37BR are tightened at positions where the branch region 39 is avoided. Thus, even in a state in which the optical fibers 52 are branched, a tightening operation of the left bolt 35BL and the right bolt 37BR can be prevented from being disturbed. In this manner, the attachment operation of the optical fiber cable branch structure 1 ends.

For fixing the above-described optical fiber cable branch structure 1 onto the closure 100, the optical fiber cable branch member 10 is provided with the through-hole 26, the fastening bolt 26B, and the fastening nut 26N that serve as a fixing member for fixing the first base member 20 and the second base member 30 of the optical fiber cable branch member 10 onto the closure. Thus, the optical fiber cable branch member 10 can be fixed onto the frame 101 only by causing the fastening bolt 26B to penetrate through the through-hole 26 while sandwiching the first base member 20 of the optical fiber cable branch member 10 and the frame 101 of the closure 100, and tightening the fastening bolt 26B in the fastening nut 26N. Thus, the optical fiber cable branch member 10 can be easily fixed onto the frame 101 of the closure 100.

In addition, in the above-described optical fiber cable branch structure 1, in addition, the first plate 21 and the second plate 31 are joined by the first left attachment portion 22 of the first plate 21 and the second left attachment portion 35 of the second plate 31 being fixed by the first bolt B1. Similarly, the first plate 21 and the second plate 31 are joined by the first left attachment portion 22 of the first plate 21 and the second left attachment portion 35 of the second plate 31 being fixed by the first bolt B1.

The first left attachment portion 22, the second left attachment portion 35, the first right attachment portion 24, and the second left attachment portion 35 are disposed on the right side or the left side of the center portion 34. In short, all of the first left attachment portion 22, the second left attachment portion 35, the first right attachment portion 24, and the second left attachment portion 35 are disposed at positions where the optical fiber units 51 protected by the protective tubes 60 are avoided. Thus, even in a state in which the protective tubes 60 protecting the optical fiber units 51 extending from the optical fiber cable 50 are covered, and the optical fiber cable 50 and the protective tubes 60 are fixed, the first base member 20 and the second base member 30 can be easily joined.

In addition, the above-described second base member 30 includes the tube-fixing portion 33. Thus, the protective tubes 60 can be easily fixed onto the second base member 30. In addition, the tube-fixing portion 33 includes the adjustment holes 33B1 to 33B4 and 33C1 to 33C4 into which the banding bands 80 can be inserted. Thus, because the banding bands 80 can be easily attached to the tube-fixing portion 33, the banding bands 80 for banding a plurality of protective tubes 60 can be easily attached to the second base member 30. As a result, the protective tubes 60 can be easily fixed.

In addition, the above-described optical fiber cable branch structure 1 includes, as attachment holes, a plurality of adjustment holes 33B1 to 33B4 and 33C1 to 33C4. Thus, adjustment holes into which the banding bands 80 are to be inserted can be determined according to the number of protective tubes 60 to be banded by the banding bands 80. Thus, even when the number of the protective tubes 60 is small, the protective tubes 60 can be stably banded by the banding bands 80.

In addition, the cable-fixing portion 32 of the above-described optical fiber cable branch structure 1 includes the narrow width portion 32A. Because the narrow width portion 32A is provided, the cable-holding ring 40 can be easily attached to the cable-fixing portion 32. Thus, the optical fiber cable 50 can be easily fixed onto the cable-fixing portion 32.

In addition, the present invention is not limited to the above-described one embodiment, and various design changes can be made without departing from the scope. For example, the cable-fixing portion 32 and the tube-fixing portion 33 provided in the second base member 30 may have other configurations. A modified example of a tube-fixing portion will be described below with reference to FIG. 11. In addition, in the modified example, members and the like that have common functions and use applications to those in the above-described embodiment are assigned the same numbers as those in the above-described embodiment, and the descriptions thereof will be omitted.

Figure 11:
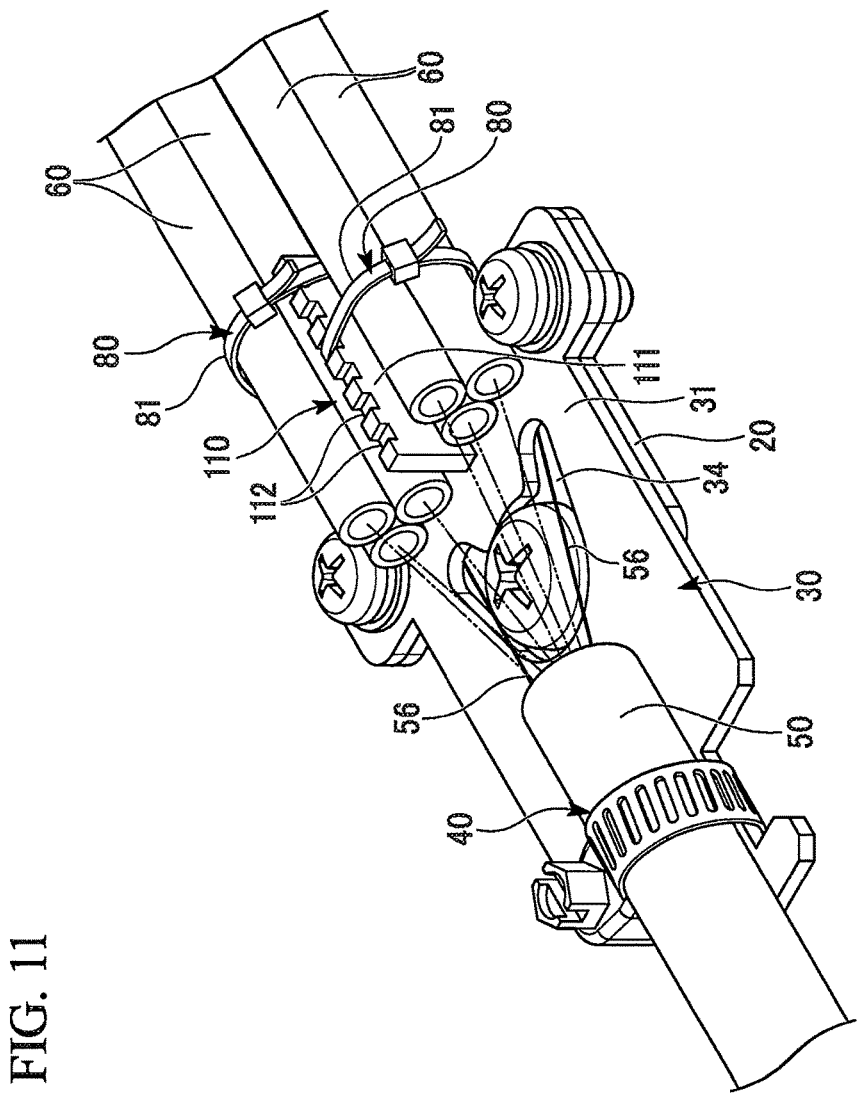
FIG. 11 is a perspective view representing another example of an optical fiber cable branch structure.

As illustrated in FIG. 11, a tube-fixing portion 110 according to the modified example includes a partition wall (dividing portion) 111. The partition wall 111 has a plate shape, and disposed so as to extend in the up-down direction. The partition wall 111 is provided at a rear-end portion of the second plate 31 of the second base member 30. The partition wall 111 is disposed at a substantially-center position in the width direction of the second plate 31. The partition wall 111 divides a plurality of protective tubes 60 into the left and the right.

A plurality of partition grooves 112 are provided on the top surface of the partition wall 111. The partition grooves 112 are disposed with being separated at substantially-equal intervals in the extending direction of the partition wall 111 (front-back direction). A width in the front-back direction of the partition grooves 112 is set to a width slightly wider than a width of the band portions 81 of the banding bands 80.

In the tube-fixing portion 110 according to the modified example, by causing the banding bands 80 for banding the plurality of protective tubes 60 to be caught, the banding bands 80 can be easily fixed. In addition, the plurality of protective tubes 60 can be easily banded. In addition, the partition wall 111 of the tube-fixing portion 110 is provided with the partition grooves 112. Because the band portions 81 of the banding bands 80 can be caught in the partition grooves 112, the banding bands 80 can be fixed more easily.

In addition, because a plurality of partition grooves 112 are provided, a plurality of banding bands 80 can be easily fixed. Thus, when a plurality of protective tubes 60 are disposed with being divided into the left and the right of the partition wall 111, both sets of the protective tubes 60 disposed on the left and the right can be easily banded. In addition, because the partition wall 111 is provided, a plurality of protective tubes 60 can be banded in a divided manner. In addition, because the partition wall 111 is provided at a substantially-center portion in the left-right direction, the protective tubes 60 can be divided in a balanced manner.

Figure 12:
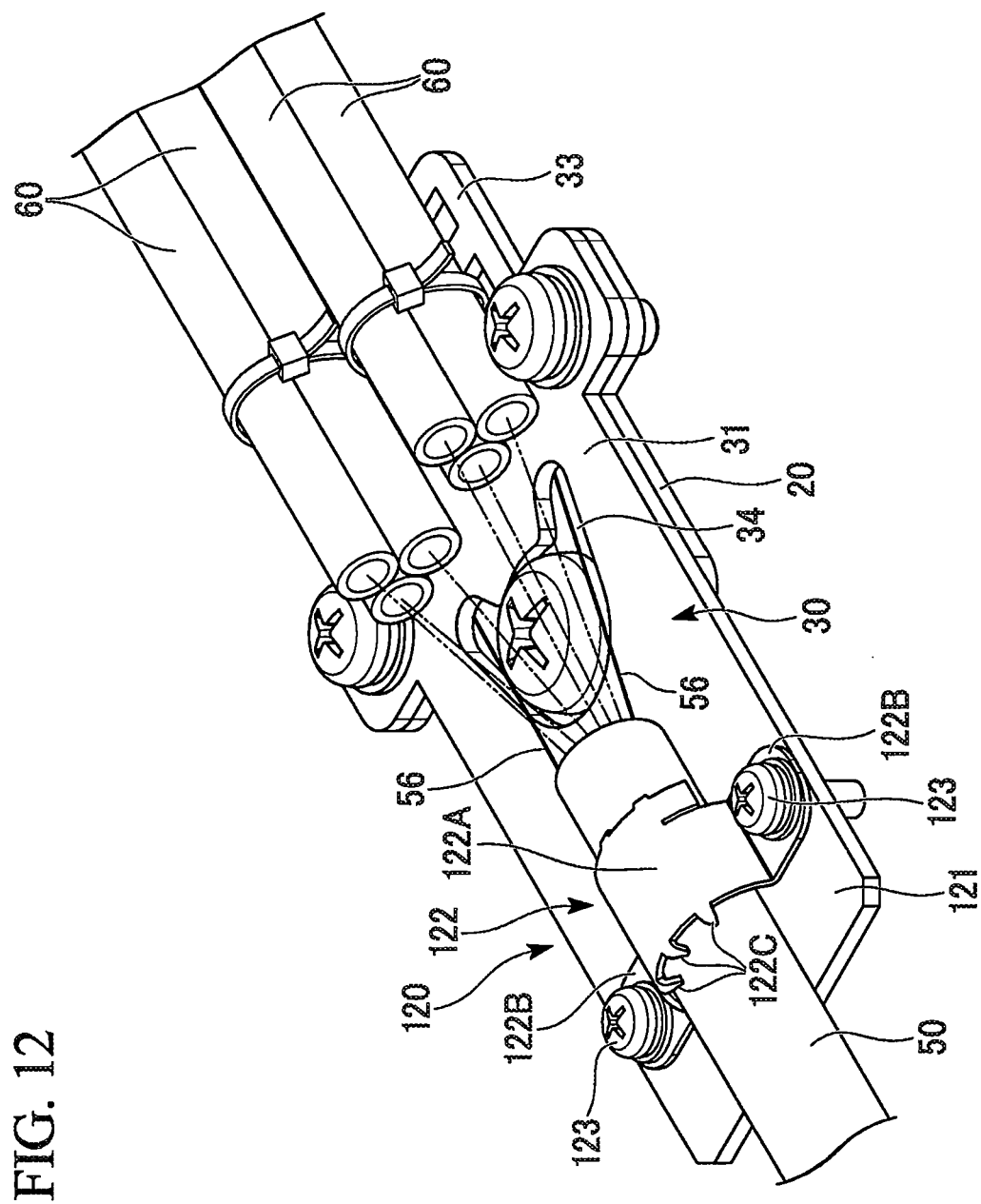
FIG. 12 is a perspective view representing yet another example of an optical fiber cable branch structure.

Next, a modified example of a cable-fixing portion and the cable-holding ring 40 will be described. As illustrated in FIG. 12, a cable-fixing portion 120 according to the modified example includes an extending portion 121 having a width equal to the center portion 34 of the second plate 31 in the second base member 30. A holding member 122 is attached to the extending portion 121 using screws 123. Thus, screw holes (not illustrated) into which the screws 123 are screwed are formed in the extending portion 121.

The holding member 122 includes a holding member main body 122A. The holding member main body 122A is a metal half ring having a semicircular cross section that arches with a diameter substantially-equal to that of the optical fiber cable 50. Plate-like fastening portions 122B are respectively formed both sides of the holding member main body 122A.

The fastening portions 122B are provided with through-holes (not illustrated), and the holding member main body 122A is fixed onto the extending portion 121 by the screws 123 penetrating through the through-holes being screwed into the screw holes provided in the extending portion 121. The holding member main body 122A is provided with pointed teeth 122C. When the holding member main body 122A is fixed onto the extending portion 121, the pointed teeth 122C bite into the jacket 55 of the optical fiber cable 50, so that the optical fiber cable 50 is fixed.

By holding the optical fiber cable 50 using the cable-fixing portion and the holding member 122 according to the modified example, the optical fiber cable 50 can be fixed onto the second base member 30. In addition, because the holding member main body 122A can be fixed onto the extending portion 121 of the second plate 31 by screwing the screws 123, the holding member main body 122A can be easily fixed. In addition, the holding member main body 122A is provided with the pointed teeth 122C, and the pointed teeth 122C bite into the jacket 55 of the fixed optical fiber cable 50. Thus, the optical fiber cable 50 can be tightly fixed.

In addition, in the above-described optical fiber cable branch structure 1, the tension resistance members 56 are held by the first plate 21 and the second plate 31. In contrast to this, the tension resistance members 56 may be sandwiched in another mode. For example, the tension resistance members 56 may be guided to a space between the first plate 21 and the frame 101 of the closure 100, and the tension resistance members 56 may be sandwiched by the first plate 21 and the frame 101 of the closure 100.

In addition, when the tension resistance members are sandwiched by the first plate 21 and the frame 101 of the closure 100, a first plate may be provided with a cable-fixing portion and a tube-fixing portion without providing a second plate.

An object to be attached may be a member other than the frame 101 of the closure 100. For example, when the optical fiber cable branch structure 1 is provided not in the closure 100 but in a cabinet, a frame of the cabinet may be regarded as an object to be attached, and when an attachment plate for attaching the optical fiber cable branch structure 1 is provided, the attachment plate may be regarded as an object to be attached. In addition, a closure serving as an object to be attached needs not be a pot-type closure one side of which optical fibers are introduced into and derived from, and may be a closure having a structure in which optical fiber cable introduction holes are provided in end surface plates on both sides of a closure sleeve, and optical fiber cables are introduced thereinto from both ends so as to go along a cable direction of the optical fiber cables.

In addition, it is preferable that an object to be attached be a conductive member such as metal because tension resistance members can be electrically-grounded. Nevertheless, an object to be attached may be nonconductive member such as resin. In addition, a base member needs not be a conductive member. In this case, a hold member for holding the tension resistance members 56 may be provided on the base member, and the hold member may be formed of a conductive member. In addition, when the tension resistance members 56 and an object to be attached formed of a conductive member are insulated, an electrically-conductive connection member for electrically-connecting the tension resistance members 56 and the object to be attached may be additionally provided.

What is claimed is:

1. An optical fiber cable branch member, comprising:
   a branch member main body;
   a cable-fixing portion which holds and fixes, onto the branch member main body, an end portion of a jacket of an optical fiber cable comprising a first optical fiber core bundle and the jacket which coats an outer circumference of the first optical fiber core bundle, and comprises a tension resistance member buried in a cable longitudinal direction;
   a tube-fixing portion which fixes, onto the branch member main body, a plurality of protective tubes which respectively cover and protect respective outer circumferences of a plurality of second optical fiber core bundles obtained by branching the first optical fiber core bundle extending from the end portion of the jacket; and
   a main body-fixing portion which fixes the branch member main body onto an object to be attached.

2. The optical fiber cable branch member according to claim 1,
   wherein the branch member main body comprises a first member to be fixed to a conductive member connected to a grounding cable, a second member to be joined to the first member, and a joint portion which joins the first member and the second member, and
   wherein the tension resistance member is held by the first member and the second member joined by the joint portion.

3. The optical fiber cable branch member according to claim 1, wherein the cable-fixing portion and the tube-fixing portion are provided on a plate material.

4. The optical fiber cable branch member according to claim 1, wherein the cable-fixing portion further comprises a band attachment portion to which a fastening band which can fasten the optical fiber cable is attached.

5. An optical fiber cable branch structure, comprising:
   an optical fiber cable comprising a first optical fiber core bundle and a jacket which coats an outer circumference of the first optical fiber core bundle, and comprises a tension resistance member buried in a cable longitudinal direction;
   an optical fiber cable branch member which branches the first optical fiber core bundle extending from an end portion of the jacket, into a plurality of second optical fiber core bundles;
   the plurality of second optical fiber core bundles branched by the optical fiber cable branch member; and
   a plurality of protective tubes which respectively cover and protect respective outer circumferences of the plurality of second optical fiber core bundles,
   the optical fiber cable branch member comprising:
   a branch member main body;
   a cable-fixing portion which holds and fixes the end portion of the jacket of the optical fiber cable onto the branch member main body;
   a tube-fixing portion which fixes, onto the branch member main body, the plurality of protective tubes which protect the plurality of second optical fiber core bundles obtained by branching the first optical fiber core bundle; and
   a main body-fixing portion which fixes the branch member main body onto an object to be attached.

6. The optical fiber cable branch structure according to claim 5,
   wherein the object to be attached is a conductive member, and is connected to a grounding cable,
   wherein the tension resistance member of the optical fiber cable is formed by a conductive member,
   wherein the tension resistance member extends from the end portion of the jacket of the optical fiber cable fixed on the optical fiber cable branch member, and
   wherein the tension resistance member is electrically-connected with the object to be attached.

7. The optical fiber cable branch structure according to claim 6, wherein the extending tension resistance member is electrically-connected with the object to be attached by being sandwiched between the branch member main body of the optical fiber cable branch member and the object to be attached.

8. The optical fiber cable branch structure according to claim 5,
   wherein the branch member main body comprises a first member to be fixed to a conductive member connected to a grounding cable, a second member to be joined to the first member, and a joint portion which joins the first member and the second member, and
   wherein the joint portion is disposed at a position where placement positions of the second optical fiber core bundles obtained by branching optical fiber cores extending from the optical fiber cable, and protected by the protective tubes are avoided.

9. The optical fiber cable branch structure according to claim 5, wherein an exposed placement region in which an exposed optical fiber core is disposed is provided between the cable-fixing portion and the tube-fixing portion.

10. The optical fiber cable branch structure according to claim 5, wherein the tube-fixing portion comprises a dividing portion which divides the plurality of protective tubes.

11. The optical fiber cable branch structure according to claim 5, wherein the tube-fixing portion comprises a banding band which bands the plurality of protective tubes, and a plurality of attachment holes into which the banding band is insertable.

12. The optical fiber cable branch structure according to claim 5, wherein a protection portion which protects an optical fiber core is provided between the cable-fixing portion and the tube-fixing portion.

13. The optical fiber cable branch structure according to claim 5, comprising a hold portion which holds the tension resistance member,
   wherein the hold portion is attached to a metal member provided in a closure.

* * * * *